Patented June 30, 1953

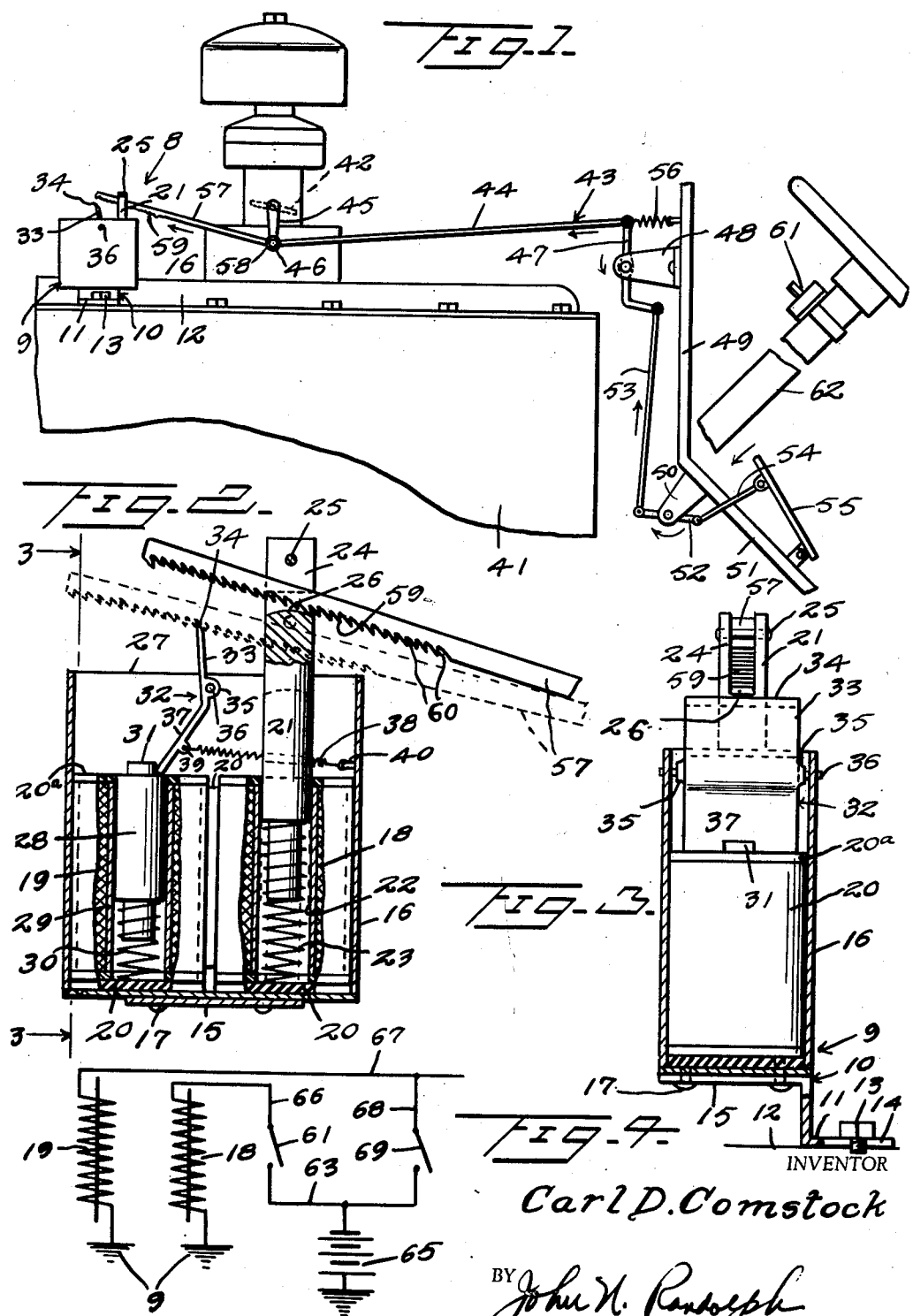

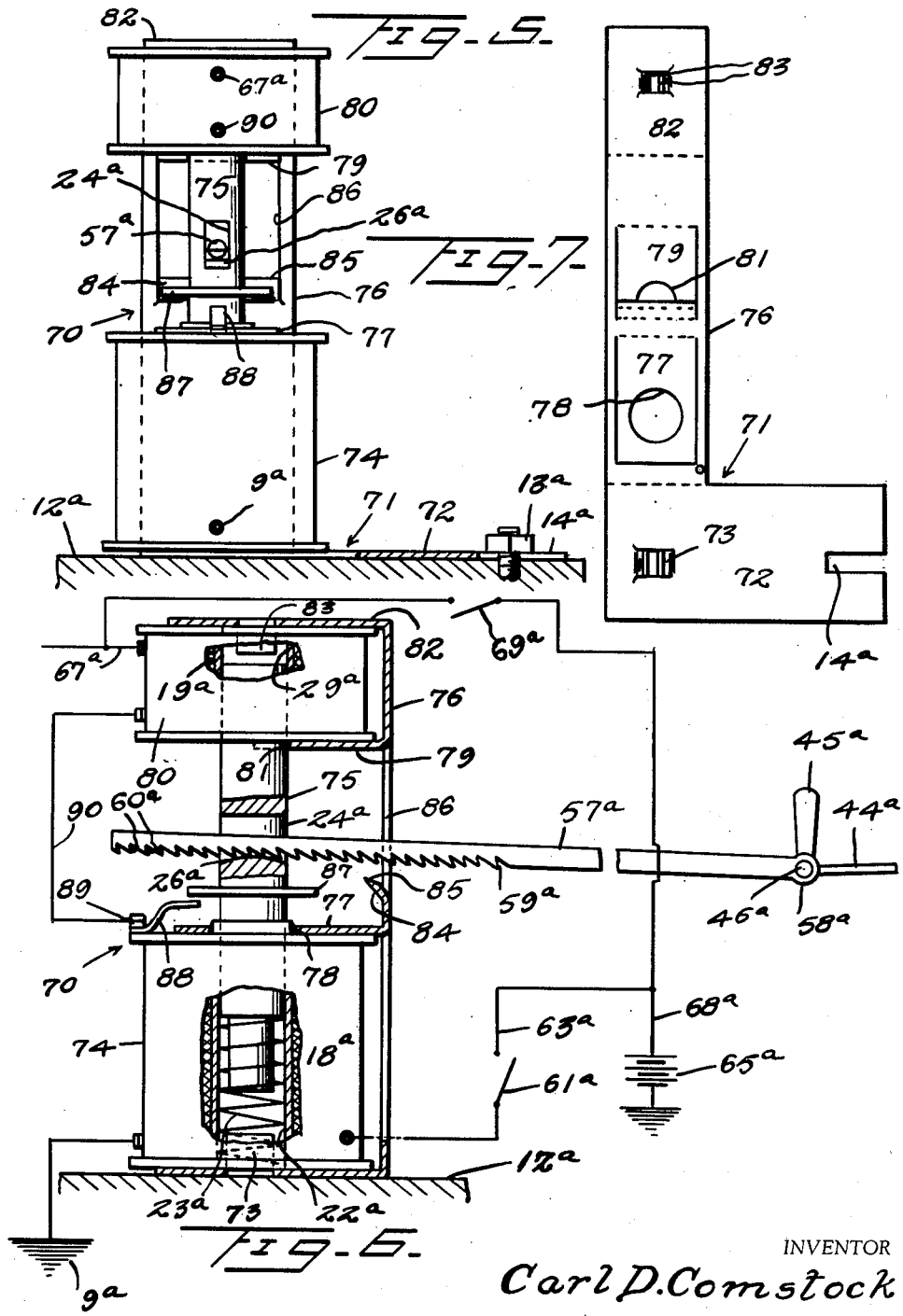

2,643,747

UNITED STATES PATENT OFFICE 2,643,747

ELECTRIC THROTTLE CONTROL

Carl D. Comstock, Levittown, N. Y.

Application April 30, 1952, Serial No. 285,175

11 Claims. (Cl. 192—3)

This invention relates to a novel form of electric throttle control for internal combustion engines and particularly for engines for motor vehicles and has for its primary object to provide an electrically actuated throttle control unit of extremely simple construction adapted to be attached to a conventional throttle linkage and to function in conjunction therewith to maintain the throttle of an engine in various open positions.

Another object of the invention is to provide a unit capable of use with various types of throttle linkages having spring means for returning the throttle linkage to an engine idling position and which may be utilized in conjunction with throttle linkages moving in any direction toward either an engine accelerating or decelerating position.

Another object of the invention is to provide an electric throttle control unit wherein electric current will be utilized only momentarily and after which the control unit will be maintained in an operative position by the throttle linkage return spring for maintaining the throttle in various desired open positions for causing the engine to operate at any desired speed.

A further object of the invention is to provide a throttle control unit having a novel automatic release whereby the control unit is rendered inoperative by a conventional operation of a driver in the operation of the motor vehicle, so that instantaneous substantially automatic release of the control unit can be accomplished.

Other objects and advantages of the invention are to provide a unit wherein no modification of any engine part is required for the installation and operation thereof, wherein instantaneous manual control may be resumed by the vehicle operator at any time, wherein a complete electrical failure of the electrical system of a vehicle will not prevent instantaneous release of the throttle control unit, and wherein the control unit may be manually positioned in an operative position by a mechanic working on the engine to cause the engine to operate at any desired speed for checking or adjusting purposes.

A further object of the invention is to provide a device which may be very economically manufactured and sold and which is substantially foolproof in operation and will eliminate the need for a hand throttle on motor vehicles.

Various other objects and advantages of the invention will hereinafter become more fully apparent from the following description of the drawings, illustrating presently preferred embodiments thereof, and wherein:

Figure 1 is a side elevational view of an internal combustion engine of a motor vehicle showing one form of the electric throttle control applied thereto and illustrating one conventional form of throttle control linkage to the throttle valve;

Figure 2 is a longitudinal sectional view, partly in side elevation, of the electric throttle control unit;

Figure 3 is a cross sectional view thereof taken substantially along a plane as indicated by the line 3—3 of Figure 2;

Figure 4 is a diagrammatic view illustrating an electric circuit for the throttle control unit;

Figure 5 is an end elevational view of another form of the throttle control unit;

Figure 6 is a side elevational view thereof, partly in vertical section and including the electric circuit, illustrated diagrammatically, and Figure 7 is a plan view of the mounting bracket for the unit of Figures 5 and 6 shown in blank form.

Referring more specifically to the drawings, and first with reference to the form of the invention as illustrated in Figures 1 to 4, the novel electric throttle control unit in its entirety is designated generally 8 and includes a mounting bracket or frame, designated generally 9, including a mounting plate 10 having a slotted end 11 which is adapted to rest on a part of an internal combustion engine head 12 and which is detachably secured thereto by one of the engine head bolts 13 which extends through the slot 14 of the end 11. The other end 15 of the mounting plate 10 is preferably upwardly offset and provides a support for a housing 16, a part of the bottom of which rests on the plate end 15 and is secured thereto by fastenings 17. The housing 16 constitutes a part of the mounting bracket or frame 9.

The electric control unit 8 includes an actuating solenoid 18 and a releasing solenoid 19. The solenoids 18 and 19 are mounted in upright positions in the bottom part of the housing 16 and are insulated from one another and from the housing by electrical insulation 20. As seen in Figures 2 and 3, the housing 16 is elongated and the solenoid 18 is mounted in the lower part of one end thereof and the solenoid 19 in the lower part of the opposite end. A core 21 is slidably mounted in the bore 22 of the solenoid 18 and is normally urged upwardly to a projected position by a coil spring 23 which is mounted in the bottom of the solenoid bore 22 below the core 21. The upper portion of the core 21 is provided with an elongated notch 24 which opens outwardly of its upper end, the upper portion of which is closed by a pin 25 which extends through the core transversely of the notch 24, so that said notch forms a slot and could equally well constitute an elongated slot by having the upper end of the core closed or solid, the notch provided with pin 25 being preferably utilized merely as a manufacturing expedient. The bottom 26 of the notch or slot 24 is convexly rounded as seen in Figure 2, for a purpose which will hereinafter become apparent. As seen in Figures 2 and 3, the notched or slotted portion of the core 21 extends substantially above the open top 27 of the housing 16.

A core 28 is slidably mounted in the bore 29 of the release solenoid 19 and is urged upwardly by a coil spring 30 which is disposed in the bore 29 below the core 28. The core 28 has a circumferentially restricted upper end forming a stop 31.

A ratchet or detent 32 comprises a plate disposed in the upper part of the housing 16 and extending upwardly from the open top thereof including an upper part 33 having a bevelled or sharpened upper edge 34. The plate portion 33 is provided adjacent the lower end thereof with angularly projecting apertured ears 35 forming journals through which a pivot pin 36 loosely extends for swingably mounting the ratchet or detent 32. The ends of the pin 36 extend outwardly through opposite side walls of the housing 16 adjacent the open upper end 27 of said housing, as best illustrated in Figure 3. The pivot pin 36 is disposed transversely of the long horizontal axis of the housing 16 and substantially intermediate of the ends thereof. The ratchet or detent 32 includes a bottom part 37 of the plate, forming the ratchet or detent, which is disposed at an oblique angle to said upper part 33 and which projects downwardly therefrom toward the solenoid core 28 and away from the solenoid core 21. A pull spring 38 has one end secured to an eye 39 which projects from the outer or under side of the plate portion 37 and has its opposite end anchored by an eye 40 to the end of the housing 16 disposed remote to the solenoid 19. The pull spring 38 is offset from and extends across one side of the core 21. The spring 38 normally urges the detent 32 to assume its position of Figure 2 with the bottom edge of the plate portion 37 resting on the top insulating member 20a which is disposed over the solenoid 19 and around its core 28, and with a portion of the bottom plate part 37 bearing against the stop 31 which projects upwardly from the insulating member 20a. The spring 38 is only of sufficient strength to swing the detent 32 counterclockwise on its pivot 36 to its position of Figure 2. The spring 30 normally supports the stop 31 in its position of Figure 2 and the core 28 is prevented from moving upwardly above its position of Figure 2 by engagement of the detent 32 with the upper end thereof.

A portion of a conventional internal combustion engine, designated generally 41 has been illustrated in Figure 1, including the engine head 12, and also including a throttle valve 42 and throttle linkage, designated generally 43. The throttle linkage 43 is of conventional construction including a link 44, one end of which is connected to a throttle valve lever 45 by a pivot pin 46, and the other end of which is pivotally connected to one end of an L-shaped lever 47 which is pivotally mounted intermediate of its ends by a bracket 48 which may be secured to any suitable part of the vehicle, such as the fire wall 49. A bracket 50, which is secured to the underside of the foot board 51, pivotally mounts a lever 52 one end of which is connected by a link 53 to the opposite end of the lever 47 and the opposite end of which is connected by a link 54 to an accelerator pedal 55 which is pivotally mounted in a conventional manner on the upper side of the foot board 51. A pull type throttle linkage spring 56 is connected to the upper end of the lever 47 and to the fire wall 49 and urges the link rod 44 rearwardly to normally cause the linkage 43 to urge the throttle valve 42 to a closed or idling position. It will be understood that only one form of linkage has been illustrated and which constitutes merely one conventional type of throttle linkage and that the throttle control unit 8 may be used with various other linkages by changing the position of the unit relatively to the pivot pin 46.

The unit 8 also includes an elongated ratchet arm or ratch 57 having an eye 58 at one end thereof which is detachably mounted on and swingably connected to the pivot pin 46. The ratchet arm 57 is provided near its opposite end and on its underside with a series of ratchet teeth 59, all of which face in the same direction and include shoulders 60 which face toward the eye 58 and which are preferably inclined slightly toward said eye from the upper to the lower ends of said shoulders. The toothed end of the ratchet arm or ratch 57 extends loosely through the notch or slot 24 and the ratchet toothed edge normally engages slidably on the rounded bottom 26, which is rounded sufficiently so that the teeth 59 will not catch thereon. When the core 21 is held in a raised position by the spring 23 the ratchet teeth 59 are disposed substantially above the upper edge 34 of the detent 32, as illustrated in full lines in Figure 2 and in Figures 1 and 3.

A push button switch 61 is mounted in a convenient position to the operator of the vehicle, as for example on the steering post 62, as illustrated in Figure 1, and is suitably connected to an electric current source of the motor vehicle as by a conductor 63, as illustrated in Figure 4, leading from the positive side of the storage battery 65 of the vehicle. A conductor 66 leads from the other side of the switch 61 to one end of the solenoid 18 and the other end of the winding of the solenoid is suitably grounded as to the engine 41 through the mounting bracket or frame 9, as seen in Figure 4. The release solenoid 19 is likewise grounded to the frame 9 and has a conductor 67 connected to a conductor 68 of the stop light circuit of the vehicle which leads from the battery 65 and in which the stop light switch 69 is interposed, between the battery and conductor 67. The switch 69 is operated in a conventional manner when the foot brake, not shown, of the vehicle is depressed for energizing the stop lights by closing the switch 69.

Assuming that the engine 41 is in operation, the accelerator pedal may be depressed to the extent desired for operation of the engine 41 and vehicle at a desired speed. The operator may then manually operate the switch 61 for closing said switch to energize the actuating solenoid 18, whereupon the core 21 will be drawn downwardly against the tension of the spring 23 to its dotted line position of Figure 2 to cause the toothed end of the ratch 57 to move downwardly swinging about the pivot pin 46 and being urged downwardly by the pin 25, so that the upper edge 34 of the detent will engage between two of the ratchet teeth 59 and against the rearwardly facing shoulder 60 of one of said teeth. The switch 61 may then be released to resume an open position. However, the spring 23 is not of sufficient strength to force the core 21 upwardly to elevate the ratch 57 as the pressure of the throttle linkage spring 56 urging the engaged shoulder 60 against the detent 32 will retain the ratchet arm 57 in its dotted line position to thus hold the throttle valve 42 in a partially opened position to operate the engine at a desired speed. It will thus be seen that electric current is only employed momentarily to render the throttle control unit 8 operative. The operator may then remove his foot from the accelerator pedal 55 and the engine will continue to operate at the same speed until the unit 8 is released. It will also be apparent that the throttle control 8 may be thus similarly used to cause the engine to operate at any desired R. P. M. while the vehicle is not in motion and for providing a partially open throttle for starting or for other purposes. Assuming that the vehicle is in operation and the driver desires to increase the operating speed, by merely pressing on the pedal 55, the ratch 57 will be displaced from right to left of Figure 2 and thereby disengaged from the detent 32 allowing the spring 23 to project the core 21 upwardly and back to its full line position of Figure 2 to thus render the unit 8 inoperative by the mere application of the foot to the accelerator and which constitutes substantially an automatic action by the vehicle operator when it is desired to accelerate a vehicle. On the other hand, if it is desired to stop the vehicle the normal operation of depressing the brake pedal closes the switch 69 thereby energizing the release solenoid 19. The core 29 thereof is drawn downwardly against the spring 30 when this occurs and the pull of the linkage spring 56 on the ratch 57 from left to right readily overcomes the tension of the weak spring 38 so that the detent 32 swings clockwise as seen in Figure 2 on its pivot 36 to release the ratch from said detent whereupon the spring 23 will project the core 21 and ratch 57 upwardly to their full line positions of Figure 2. As soon as the detent thus disengages the ratch 57, its spring 38 will swing it counter-clockwise back to its position of Figure 2 against the insulating member 20a. Consequently, when the solenoid 19 is thereafter deenergized the spring 30 will project the core 28 upwardly to cause the stop 31 to resume a position as illustrated in Figure 2 in which it prevents the detent 32 from being swung clockwise by the pull exerted on the ratch 57 by the linkage spring 56, and to thus again retain the detent 32 in a position for holding the ratch 57 in a desired position when the actuating solenoid 18 is again energized. Thus, either application of the foot brake or pressure on the accelerator will automatically and instantaneously release the throttle control 8. The throttle control 8 may be readily manually operated by a mechanic working on the engine to cause the engine to operate at a desired R. P. M. by merely pressing downwardly on the core 21 after accelerating the engine.

Figures 5, 6 and 7 illustrate another form of the electric throttle control unit, designated generally 70, including a mounting bracket or frame, designated generally 71, formed from a single blank of metal as illustrated in Figure 7, one transversely extending end of which forms a mounting plate 72 which is adapted to rest on the engine head 12a and which is detachably secured thereto by one of the engine head bolts 13a which extends through a slot 14a of the plate 72, corresponding to the slot 14. The plate 72 has struck-up tongues 73 which are anchored in the bore 22a of an actuating solenoid 18a which is supported on and secured to the mounting plate 72 and which is provided with a suitable casing 74 of electrical insulating material. A core 75 has a lower end extending slidably into the solenoid bore 22a and which is yieldably supported and normally urged upwardly by an expansion coiled spring 23a, which is disposed in the bore 22a below the core 75. The mounting bracket 71 has a substantially upright wall 76, forming a part of the blank and which extends upwardly from a portion of the plate 72. A bottom tongue is struck-up from a part of the wall 76 to form a flange 77 which bears on the top of the solenoid casing 74 to retain the casing against the plate 72 and which flange 77 has an opening 78 to loosely accommodate the core 75. An upper part of the wall 76 has a struck-up tongue 79 which is disposed above and substantially parallel to the flange 77 and which forms a supporting flange for an upper release solenoid 19a which is likewise enclosed in a casing 80 of electrical insulating material. The bore 29a of the release solenoid 19a slidably receives the upper end of the core 75 which extends upwardly into said bore 29a and which is accommodated loosely in a notch 81 of the top flange 79. Accordingly, the core 75 functions with the actuating solenoid 18a and release solenoid 19a. The mounting bracket 71 has an integral top wall 82 extending horizontally from the upper end of the wall 76 which engages the upper end of the solenoid 19a and which is provided with struck-out tongues 83 which extend downwardly into the upper end of the bore 29a.

A portion of the wall 76 immediately below the part thereof forming the upper flange 79 is bent inwardly of the mounting bracket 71 at an oblique angle to form a ratchet or detent 84 having a bevelled upper edge 85 corresponding to the detent edge 34. The struck-out flange 79 forms an opening 86 in the wall 76 through which the ratchet arm or ratch 57a loosely extends. The ratch 57a is provided with ratchet teeth 59a in the end portion thereof which extends through the opening 86 and through a slot 24a in the intermediate portion of the core 75. Said slot 24a is provided with a rounded bottom 26a, corresponding to the rounded bottom 26 and for the same purpose. The end of the ratch 57a which is disposed remote to the toothed end is provided with an eye 58a which is pivotally connected to a pivot pin 46a connecting the throttle valve lever 45a to a link 44a, forming a part of a throttle linkage which may correspond to the throttle linkage as illustrated in Figure 1. The ratchet teeth 59a have shoulders 60a, substantially corresponding to the shoulders 60 and which face toward the end 58a of the ratch 57a. It will be noted that the ratch 57a is illustrated in Figure 5 as being substantially circular in cross section so that said ratch may be formed from a rod whereas the ratch 57 is illustrated in Figure 3 as being formed from a bar having the ratchet teeth formed in the bottom edge thereof, and either form of construction may be used for either the unit 8 or the unit 70.

A collar 87, preferably formed of electrical insulating material, is secured around the core 75 beneath and adjacent the slot 24a. A leaf spring 88 has an outer end secured to the top of the insulated casing 74 by a binding post 89 and has an inner free end disposed above and normally spaced from the flange 77 and disposed beneath the collar 87. As illustrated in Figure 6, a conductor 68a, corresponding to the conductor 68 and leading from the positive terminal of a current source or storage battery 65a, has a stop light switch 69a interposed therein which is moved to a closed position by operation of a brake pedal for closing the electric circuit to the stop lights. A conductor 67a connects the release solenoid 19a to the conductor 68a and the switch 69a is disposed between the battery 65a and said conductor 67a. A branch conductor 63a is connected to the conductor 68a between the switch 69a and the battery 65a or may be connected directly to the positive terminal of the battery or to any other positive lead extending from the battery. The opposite end of the conductor 63a is connected to the actuating solenoid 18a. A switch 61a is interposed in the conductor 63a and corresponds to the switch 61 and may be mounted on the steering column or in any other suitable convenient location to the vehicle operator. The solenoid 18a is grounded at 9a, as for example to the engine head 12a or may be grounded to the engine head through the mounting bracket 71. A ground conductor 90 is connected to and leads from the release solenoid 19a and is connected to the leaf spring switch element 88 by the contact post 89.

The operation of the unit 70 is very similar to the operation of the unit 8 and will therefore merely be described briefly. The accelerator pedal, not shown in Figures 5 to 7, is actuated as previously described to open the engine throttle valve and in so moving the lever 45a is caused to swing to the left as seen in Figure 6 to thereby displace the ratch 57a from right to left. The throttle valve may be latched in a desired open position by manually closing the switch 61a momentarily. This causes the solenoid 18a to be energized for attracting the core 75 downwardly against the action of the spring 23a. This downward movement of the core 75 causes the ratch 57a to swing downwardly on its pivot 46a so that the detent edge 85 engages between two of the teeth 59a and abuts one of the shoulders 60a to latch the ratch in its adjusted advanced position. The switch 61a is then released to resume an open position so that the solenoid 18a will not be drawing current from the battery. However, the throttle linkage spring, not shown, will effectively hold one of the ratchet teeth 59a against the detent edge 85 to prevent the spring 23a from forcing the core 75 and ratchet 57a upwardly. However, release of the ratch can be instantaneously effected by pressure on the accelerator pedal as previously described in reference to the unit 8. Additionally, when the core 75 is displaced downwardly by energizing the solenoid 18a, the collar 87 moves downwardly to engage and force the spring contact 88a against the flange 77 to thereby complete the ground from the release solenoid 19a through the supporting bracket 71 to the engine head 12a. The ratch 57a together with the throttle linkage spring also maintains the ground switch element 88 in a circuit closing position so long as the ratch is engaged by the detent 84. Consequently, if the brake pedal is depressed to close the stop light switch 69a, the solenoid 19a will thus be energized and has sufficient strength to draw the core 75 upwardly to disengage the ratchet tooth shoulder 60a from the detent edge 85 to thus effect the release of the unit 70. However, it will be noted that the solenoid 19a will not be energized by the closing of the switch 69a except when the ratchet 57a is held by the detent 84. As the operation of the unit 70 otherwise corresponds to the operation of the unit 8, a further description thereof is considered unnecessary.

It will also be apparent that the unit 70 will function without the upper release solenoid 19a and its associated parts except that the ratch 57a may only then be released by a slight pressure being exerted on the accelerator pedal which is connected to the throttle linkage including the rod 44a.

Various other modifications and changes are contemplated and may obviously be resorted to, without departing from the spirit or scope of the invention as hereinafter defined by the appended claims.

I claim as my invention:

1. The combination with an internal combustion engine and throttle control linkage including means for normally urging the linkage to an idling position of the throttle valve, of an electric throttle control comprising a mounting frame fixedly positioned relatively to the throttle linkage, an actuating solenoid secured to the mounting frame and adapted to be electrically connected to a source of current, a normally open switch normally deenergizing the actuating solenoid, a core having one end slidably disposed in said solenoid, a spring urging the core outwardly of the solenoid, a ratch having one end pivotally connected to a part of the throttle linkage, said ratch having a series of ratch teeth formed in another part thereof, a portion of said ratch extending slidably through a part of the core disposed outwardly of the solenoid, and a detent supported by the mounting frame, said core being drawn inwardly of the solenoid when the solenoid is energized for swinging the toothed portion of the ratch toward the detent, said detent being disposed to engage between selected teeth of the ratch when the ratch is swung toward said detent, said ratchet teeth and detent being constructed and arranged to cooperate with said means for normally urging the throttle linkage to an idling position of the throttle valve for frictionally retaining said ratchet teeth in engagement with the detent against the action of said solenoid spring when said switch is opened to deenergize the solenoid whereby momentary closing of said switch and energizing of the solenoid will set the throttle control unit in an operative position for maintaining the throttle valve in a desired open position, said ratch being disengaged from the detent by a movement of the throttle linkage to effect a further opening of the throttle valve.

2. An electric throttle control as in claim 1, a release solenoid supported by the mounting frame and adapted to be connected to a stop light circuit of a motor vehicle to be energized by closing the stop light switch when the brake pedal is depressed, and means attracted by said release solenoid when energized for disengaging the ratch and detent.

3. An electric throttle control as in claim 1, a release solenoid supported by the mounting frame and adapted to be connected to a stop light circuit of a motor vehicle to be energized by the closing of a stop light switch effected by application of a foot brake, a core reciprocally mounted in said release solenoid, a spring normally urging the release solenoid core to a projected position, said detent being pivotally connected to the mounting frame and having a portion normally engaging the release solenoid core to retain the detent in a position to engage and hold the ratch, a detent spring normally urging the detent to a position to be held by the release solenoid core, said release solenoid core being drawn out of engagement with the detent when the release solenoid is energized whereby said means for normally urging the throttle linkage to an idling position of the throttle valve will swing the detent to a position to disengage the ratch and to permit the actuating solenoid core to be displaced outwardly of the actuating solenoid for swinging the ratch away from the detent, said detent spring thereafter returning the detent to a position to be re-engaged and held in an operative position by the release solenoid core when the release solenoid is deenergized and the core thereof is projected by the release solenoid core spring.

4. An electric throttle control as in claim 1, said ratchet teeth having shoulders facing toward the pivoted end of the ratch, and said detent having a bevelled edge selectively engaging one of said ratchet teeth shoulders.

5. An electric throttle control as in claim 1, said core having a slot extending therethrough for slidably receiving the ratch, one end of said slot engaging the ratch for holding the ratch out of engagement with the detent in one position of said core and the other end of said slot engaging and displacing the ratch into engagement with the detent when the actuating solenoid is energized.

6. An electric throttle control as in claim 1, said core having a notched outer end through which said ratch slidably extends, the inner end of said notch supporting the ratch out of engagement with the detent in one position of the core, and a pin extending across said notch and engaging and displacing the ratch into engagement with the detent when the core is drawn inwardly of the solenoid.

7. An electric throttle control as in claim 1, said mounting frame including a mounting plate adapted to be detachably secured to an engine head by engagement with an engine head bolt for detachably supporting the throttle control in a fixed position relatively to the throttle linkage.

8. An electric throttle control as in claim 1, a release solenoid supported by the mounting frame and adapted to be electrically connected to a stop light circuit of a motor vehicle, said core having an opposite end slidably engaging in said release solenoid, said core being drawn away from the actuating solenoid when the release solenoid is energized for swinging the ratch away from the detent.

9. An electric throttle control as in claim 8, and a spring switch element forming a ground connection of said release solenoid and normally disposed in a circuit interrupting position, and an actuating element fixed to said core and disposed to engage and displace said switch element into a circuit closing position in engagement with a part of the mounting frame when said core is attracted by the actuating solenoid.

10. An electric throttle control as in claim 1, said detent comprising an integral portion of the mounting frame.

11. An electric throttle control unit as in claim 10, said detent being inclined in a direction away from the pivoted end of said ratch from a secured end to a free end thereof, and said ratchet teeth including shoulders facing toward the free end of said detent and toward the pivoted end of the ratch.

CARL D. COMSTOCK.

References Cited in the file of this patent
UNITED STATES PATENTS

| Number | Name | Date |
| --- | --- | --- |
| 2,467,485 | Krieg | Apr. 19, 1949 |
| 2,509,358 | Krieg | May 30, 1950 |